Figure 1:
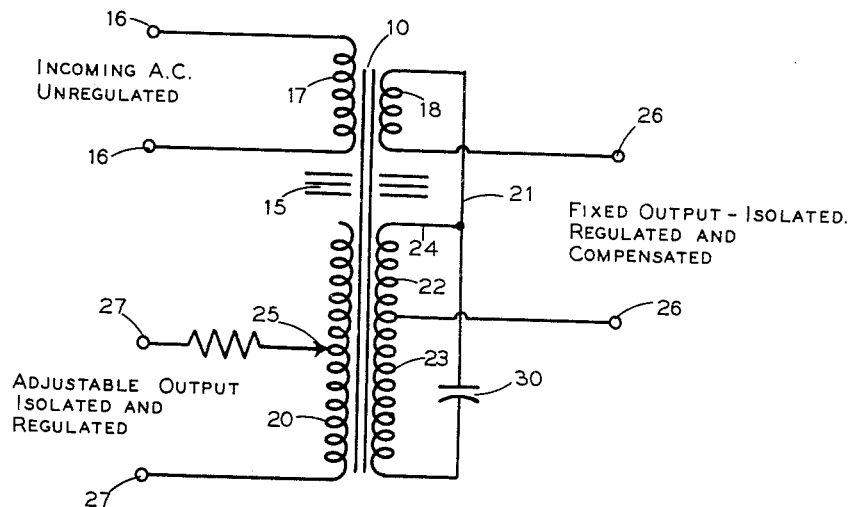

July 11, 1961

A. ROSIN 2,992,386

POWER SUPPLY WITH ADJUSTABLE STABILIZED OUTPUT VOLTAGE

Filed Aug. 1, 1958

2 Sheets-Sheet 1

INVENTOR.
Arthur Rosin

BY

ATTORNEY

July 11, 1961

A. ROSIN 2,992,386

POWER SUPPLY WITH ADJUSTABLE STABILIZED OUTPUT VOLTAGE

Filed Aug. 1, 1958

2 Sheets-Sheet 2

INVENTOR.
Arthur Rosin
BY
ATTORNEY

# United States Patent Office 2,992,386
Patented July 11, 1961

2,992,386
POWER SUPPLY WITH ADJUSTABLE STABILIZED OUTPUT VOLTAGE
Arthur Rosin, Flushing, N.Y., assignor to Forbro Design Inc., New York, N.Y., a corporation of New York
Filed Aug. 1, 1958, Ser. No. 752,594
10 Claims. (Cl. 323—57)

This invention relates to constant output voltage power supplies for electrical or electronic equipment and, more particularly, to such a power supply in which the output voltage is adjustable and which is a simple compact unit.

For proper operation of various electrical and electronic equipment from A.C. power sources, a source of constant voltage is necessary or desirable. Line variations and disturbances, as well as voltage variations due to changes in load, prevent such equipment being supplied with constant voltage from A.C. power lines. In order to maintain the input voltage to such equipment at a constant value, voltage regulators must be interposed between the supply line and the equipment.

Known voltage regulating devices employ combinations of a linear inductance, a saturable iron core inductance, and capacitance, and include such known and commercially available devices as voltage stabilizing transformers, magnetic regulator transformers, ferro-resonant regulators, and flux oscillators.

For proper control of electrical and electronic equipment, particularly in laboratory work and in testing, it is useful to have an A.C. power source with continuously adjustable output voltage. Adjustable output autotransformers, manufactured and sold under various tradenames, have been used for this purpose.

To facilitate control and testing of equipment, combinations of the above-mentioned voltage regulating devices and adjustable autotransformers have been used, sometimes in combination with an additional transformer to provide isolation from the power line, to adjust the voltage to the desired operating range. However, such combinations have disadvantages from the standpoint of cost and bulk of the equipment. Also, since the voltage regulator or stabilizer must be followed by the adjustable auto-transformer, and/or isolation transformer, the voltage drops inherent in these following components tend to nullify the effect of the voltage stabilizer in regulating for load changes.

In accordance with the present invention, regulation of the voltage together with continuously adjustable output voltage is provided in a simple and effective manner and without the foregoing disadvantages. More particularly, the invention comprises a voltage stabilizing transformer including one or more isolated secondary windings, one or more of which is provided with a brush slider mechanism for adjustment of the voltage derived therefrom.

Where isolation from the line is not essential, the invention may be applied to a voltage stabilizing autotransformer, thus permitting additional apparatus economy and compactness. In any case, the material of the slider brush has sufficient resistance to limit the circulating current to a safe value when the brush is in transition between adjacent turns of the winding.

The invention may take any one of several forms. For example, it may comprise a single unit on a magnetic core of special design incorporating a magnetic shunt, thus enabling the leakage inductance to serve as the linear inductance. Alternatively, the linear inductance may be a separate element, permitting the device to utilize presently available standard magnetic core structures. This latter arrangement is particularly applicable where it is desired to use a toroidal core structure for the saturated inductance in order to take advantage of its superior magnetic properties as well as the ease of applying a rotating slider assembly thereto.

Figure 2:
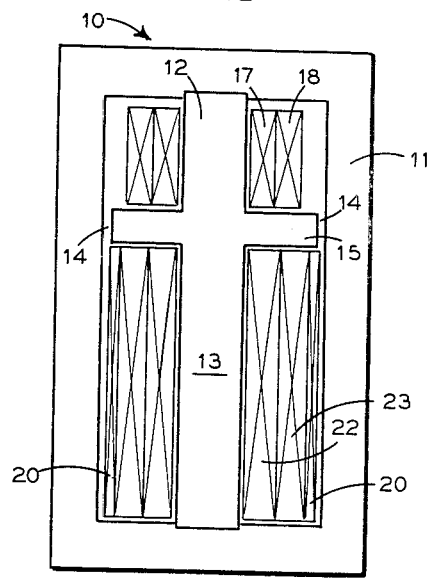
Figure 3:
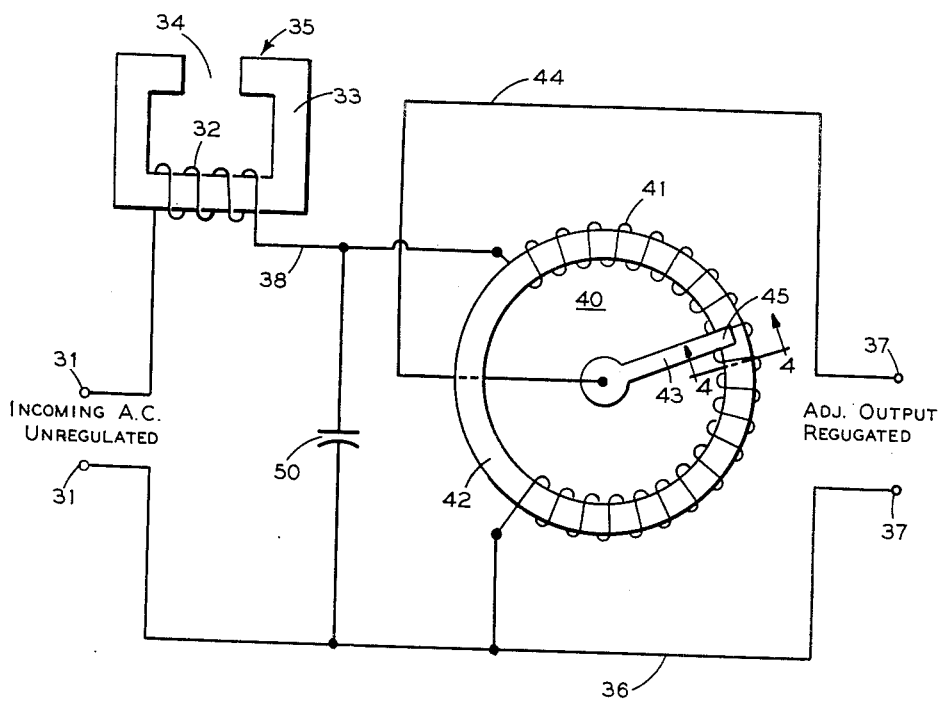
Figure 4:
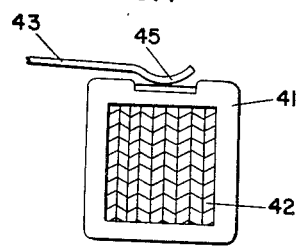

For an understanding of the invention principles, reference is made to the following description of typical embodiments thereof as illustrated in the accompanying drawings. In the drawings:

FIG. 1 is a schematic wiring diagram of one embodiment of the invention;
FIG. 2 is a plan or elevation view of the magnetic core thereof with the windings thereon;
FIG. 3 is a schematic wiring diagram of another embodiment of the invention; and
FIG. 4 is a sectional view, greatly enlarged, taken on the line 4—4 of FIG. 3.

Referring to FIGS. 1 and 2, the principles of the invention are illustrated as applied to a voltage stabilizing transformer of the type shown in U.S. Patent No. 2,434,493, issued to L. J. Gburski on January 13, 1948, and in which both the linear and non-linear (saturated) inductances are provided in a single unit by use of a magnetic core structure 10 comprising an outer frame 11, a winding core 12, 13 and a shunt 15 forming, with frame 11, air gaps 14. The core structure is laminated.

The unregulated input A.C. potential is connected to terminals 16 of an input winding 17 wound concentrically on core section 12 with a first output (compensating) winding 18. Second and third series connected output windings 22 and 23 are concentrically wound on core section 13, and an adjustable output winding 20 is wound concentrically over windings 22, 23 on core section 13. Winding 20 is wound in a single layer, and the insulation is removed therefrom along a narrow path. A slider mechanism, including a resistance brush 25 is movable along this path. Resistance brush 25 is of the type shown and described in Karplus et al. U.S. Patent No. 2,009,013, wherein the brush is made of a mixture of carbon, graphite and powdered copper in proportions to give the required specific resistance or the required potential drop through the brush.

A conductor 21 interconnects the outer ends of windings 18 and 23. A capacitor 30 is connected across windings 23 and 24. A branch 24 connects conductor 21 to the outer end of winding 22. The inner end of winding 18 and the junction of windings 22, 23 are connected to terminals 26 to provide thereat a fixed output voltage which is isolated, regulated, and compensated. One end of winding 20 and brush 25 are connected to terminals 27 to provide thereat an adjustable output voltage which is isolated and regulated.

Saturation of that part of the core 13 on which the winding 20 is located occurs in the following manner. When the inductance of winding 20 comes into ferro-resonance with capacitor 30, the voltage across winding 20 rises to a fairly highly, stable, and predetermined value. This saturates the iron in the section of the core 13 on which coil 20 is wound, due to the winding operating above the knee of the volt-ampere characteristic curve of the transformer. As this section of the core saturates, due to the increased voltage, most of the flux due to primary winding 17 circulates through the now relatively lower reluctance of the shunts 15. The leakage inductance between the primary and secondary winding, resulting from the shunts 15, behaves in the electrical circuit in the same manner as that of a separate linear inductance.

Insofar as stabilization of the output voltage at the terminals 26, 26 or 27, 27 is concerned, the disclosed arrangement operates in the same manner as the voltage stabilizing transformer of said Gburski U.S. Patent No. 2,434,493. The novel feature of the present invention is the utilization of a resistance brush, similar to the brush 28 of Karplus et al. U.S. Patent No. 2,009,013, to obtain an adjustable output voltage from one of the compensating windings of the voltage stabilizing transformer.

Referring to the embodiment of FIGS. 3 and 4, the unregulated A.C. voltage is supplied to input terminals 31. One terminal 31 is connected to one end of the winding of coil 32 of a linear reactor 35 including a laminated magnetic core 33 having an air gap 34. A conductor 36 connects the other input terminal 31 to one output terminal 37.

A conductor 38 connects the other end of winding 32 to one end of the winding 41 of a saturable autotransformer 40, the other end of winding 41 being connected to conductor 36. Winding 41 is a toroidal winding over a tape-wound magnetic core 42 of grain oriented steel or a nickel alloy, core 42 having a rectangular cross-section. The insulation is removed from winding 41 along a narrow path for contact with a rotatable slider 43 having a high resistance brush 45. A conductor 44 connects slider 45 to the other output terminal 37, and a capacitor 50 is connected across conductors 36, 38 so that it is paralleled across winding (41) of autotransformer 40.

The arrangement of FIGS. 3 and 4 provides an adjustable regulated output voltage at output terminals 37.

In connection with the specific embodiments herein described, it is within the province of this invention to provide that the linear inductance, capacities and non-linear (saturable) inductance may be physically separate and connected to each other; alternately the inductance windings may be coupled magnetically on a magnetic core of desired conformation. In such instances the leakage inductance between the primary and secondary windings behaves as a linear inductance while the secondary winding on the particular magnetic arc cross-section may provide the non-linear (saturable) inductance. In either of the two alternate embodiments the electromagnetic effects herein conceived are equivalent.

While specific embodiments of the invention have been shown and described in detail to illustrate the application of the invention principles, it will be understood that the invention may be embodied otherwise without departing from such principles.

What is claimed is:

1. An A.C. power supply, having an adjustable stabilized output voltage, comprising, in combination, a linear reactor including a coil connected to a source of variable input A.C. potential and wound on a magnetic core having an air gap, and connected in series with a non-linear inductor comprising an insulated winding wound on a magnetic core; the insulation being removed from a relatively narrow strip along said winding; a slider mechanism including a resistance brush movable along the bared strip; a capacitor connected across said insulated winding to cause the latter to operate at a high voltage at which its core is saturated; and a pair of regulated voltage output terminals connected, respectively, to an end of said insulated winding and said brush.

2. An A.C. power supply as claimed in claim 1 in which said coil and winding are wound on a common core, and separated by a magnetic shunt providing such air gap.

3. An A.C. power supply as claimed in claim 1 in which the coil of the linear reactor and the winding of the non-linear inductor are wound on a common core including a rectangular frame surrounding said coil and winding and magnetically continuous with a linear core on which said coil and winding are wound; said magnetic shunt comprising arms magnetically continuous with said linear core and extending normal thereto toward said frame but spaced from the latter to provide air gaps, said arms being disposed between said coil and winding.

4. An A.C. power supply as claimed in claim 3 including a second winding wound concentrically with said coil; third and fourth windings connected in series with each other and wound concentrically with each other and with said insulated winding; a conductor interconnecting the outer ends of said third and fourth windings to an end of said second winding and having said capacitor therein; and means connecting the other end of said second winding and the junction of said third and fourth windings to respective second output terminals to provide a fixed regulated output voltage therebetween.

5. An A.C. power supply as claimed in claim 4 in which the winding of the non-linear inductor comprises a single layer wound on the outside of said third and fourth windings.

6. An A.C. power supply, having an adjustable stabilized output voltage, comprising, in combination, a linear reactor including a coil connected to a source of variable input A.C. potential and wound on a magnetic core having an air gap; an autotransformer comprising an insulated winding, coupled to said coil and isolated from said source, and wound on a magnetic core; the insulation being removed from a relatively narrow strip along said winding; a slider mechanism including a resistance brush movable along the bared strip; a capacitor coupled across said autotransformer to cause the latter to operate at a high voltage at which its core is saturated; and a pair of regulated voltage output terminals connected, respectively, to an end of said autotransformer winding and said brush.

7. An A.C. power supply, having an adjustable stabilized output voltage, comprising, in combination, a linear reactor including a coil connected to a source of variable input A.C. potential and wound on a laminated magnetic core having an air gap; an autotransformer comprising an insulated winding, coupled to said coil and isolated from said source, and wound on a laminated magnetic core; the insulation being removed from a relatively narrow strip along said winding; a slider mechanism including a resistance brush movable along the bared strip; a capacitor coupled across said autotransformer to cause the latter to operate at a high voltage at which its core is saturated; and a pair of regulated voltage output terminals connected, respectively, to an end of said autotransformer winding and said brush.

8. An A.C. power supply as claimed in claim 6 in which said coil and winding are wound on physically separated cores.

9. An A.C. power supply as claimed in claim 6 in which said autotransformer winding is wound on a toroidal magnetic core.

10. An A.C. power supply as claimed in claim 6 in which said autotransformer winding is wound on a toroidal magnetic core having a rectangular cross-section.

References Cited in the file of this patent

UNITED STATES PATENTS

| | | |
|---|---|---|
| 2,367,625 | Short | Jan. 16, 1945 |
| 2,434,493 | Gburski | Jan. 13, 1948 |
| 2,505,620 | John et al. | Apr. 25, 1950 |